US008401823B2

(12) United States Patent
Klippel

(10) Patent No.: US 8,401,823 B2
(45) Date of Patent: Mar. 19, 2013

(54) METHOD AND ARRANGEMENT FOR DETECTING, LOCALIZING AND CLASSIFYING DEFECTS OF A DEVICE UNDER TEST

(76) Inventor: Wolfgang Klippel, Dresden (DE)

( * ) Notice: Subject to any disclaimer, the term of this patent is extended or adjusted under 35 U.S.C. 154(b) by 282 days.

(21) Appl. No.: 12/819,455

(22) Filed: Jun. 21, 2010

(65) Prior Publication Data

US 2011/0015898 A1 Jan. 20, 2011

(30) Foreign Application Priority Data

Jul. 17, 2009 (DE) ..................... 10 2009 033 614 U

(51) Int. Cl.
*G05B 23/00* (2006.01)

(52) U.S. Cl. ........................................ 702/185; 702/191

(58) Field of Classification Search .................. 702/185, 702/191

See application file for complete search history.

(56) References Cited

U.S. PATENT DOCUMENTS

| | | | | |
|---|---|---|---|---|
| 4,096,736 | A | 6/1978 | Moshier | 73/40 |
| 4,812,746 | A * | 3/1989 | Dallas, Jr. | 324/121 R |
| 5,533,383 | A | 7/1996 | Greene et al. | 73/40.5 A |
| 5,761,383 | A * | 6/1998 | Engel et al. | 706/14 |
| 6,227,036 | B1 | 5/2001 | Yonak et al. | 73/40.5 |
| 6,474,164 | B1 * | 11/2002 | Mucciardi et al. | 73/602 |
| 6,689,064 | B2 * | 2/2004 | Hager et al. | 600/454 |
| 7,039,198 | B2 * | 5/2006 | Birchfield et al. | 381/92 |
| 8,146,429 | B2 * | 4/2012 | Ume et al. | 73/622 |
| 2003/0187636 | A1 | 10/2003 | Klippel et al. | 704/220 |
| 2008/0172576 | A1 * | 7/2008 | Kusko et al. | 714/33 |
| 2009/0304195 | A1 | 12/2009 | Fillol | 381/59 |

FOREIGN PATENT DOCUMENTS

| | | | |
|---|---|---|---|
| EP | 0 413845 | A1 | 2/1991 |
| EP | 0413845 | A1 | 2/1991 |

OTHER PUBLICATIONS

W. Klippel et al., “Loudspeaker Testing at the Production Line”, Audio Engineering Society Convention Paper, Paris, France, May 2006, pp. 1-13.*

Klippel at al.. “Loudspeaker Testing At the Production Line”, Audio Engineering Society Convention Paper. Paris. France, May 2006, pp. 1-13.

* cited by examiner

*Primary Examiner* — Michael Nghiem
*Assistant Examiner* — Alexander Satanovsky
(74) *Attorney, Agent, or Firm* — Koppel, Patrick, Heybl & Philpott

(57) ABSTRACT

An arrangement and method for assessing and diagnosing the operating state of a device under test in the presence of a disturbing ambient noise and for detecting, localizing and classifying defects of the device which affect its operational reliability and quality. At least two sensors monitor signals at arbitrary locations which are affected by signals emitted by defects and by ambient noise sources. A source analyzer receives the monitored signals, identifies the number and location of the sources, separates defect and noise sources, and analyzes the deterministic and stochastic signal components emitted by each source. Defect and noise vectors at the outputs of the source analyzer are supplied to a defect classificator which detects invalid parts of the measurements corrupted by ambient noise, accumulates the valid parts, assesses the quality of the system under test and identifies the physical causes and location of the defects.

14 Claims, 5 Drawing Sheets

METHOD AND ARRANGEMENT FOR DETECTING, LOCALIZING AND CLASSIFYING DEFECTS OF A DEVICE UNDER TEST

FIELD OF THE INVENTION

The invention generally relates to an arrangement and a method for assessing and diagnosing the operating state of a device under test in the presence of ambient noise, and for detecting, localizing and classifying defects of the device which affect its operational reliability and quality. The arrangement is useful with electrical, mechanical or other systems having an input which receives an excitation signal; transducers (such as loudspeakers) are a primary application.

DESCRIPTION OF THE RELATED ART

A device under test (e.g., a loudspeaker) is excited by a stimulus u(t), and the state of the system or the output signal (e.g., the sound pressure p) is measured at a particular location $r_i$. The measured signal $p(t,r_i)$ is given by:

$$p(t,r_i)=p_{lin}(t,r_i)p_{reg}(t)+p_{rb}(t)+p_{stoch}(t)+p_n(t) \qquad (1)$$

This equation comprises a linear component $p_{lin}(t,r_i)$ which is coherent with the input signal u(t), and a regular distortion component $p_{reg}(t,r_i)$, an irregular deterministic distortion component $p_{rb}(t,r_i)$ and a stochastic component $p_{stoch}(t,r_i)$ which are incoherent with the input signal u(t). For example, the regular distortion component $p_{reg}(t,r_i)$ is generated by motor and suspension nonlinearities inherent in loudspeakers. The irregular deterministic distortion component $p_{rb}(t,r_i)$ is generated by loudspeaker defects which are directly coupled with mechanical vibration such as hard limiting of the mechanical suspension system, beating of the wire at the diaphragm and buzzing parts. The stochastic distortion component $p_{stoch}(t,r_i)$ is generated by loose particles, a rubbing coil and by turbulent air flow generated in enclosure leaks. The measured signal $p(t,r_i)$ is also corrupted by ambient noise $p_n(t)$ generated in the production environment.

Many defect detection techniques are known. For example, Zaschel shows in European patent EU 413 845 that the separation of deterministic and stochastic components is beneficial for the early identification of defects. Klippel suggested an adaptive filter in German patent DE 102 14407 to separate the regular distortion component $p_{reg}(t,r_i)$ from irregular deterministic distortion component $p_{rb}(t,r_i)$.

The stochastic distortion component $p_{stoch}(t,r_i)$ generates a dense amplitude spectrum which goes up to ultra-sonic frequencies. G. Moshier exploits this property for leak detection in U.S. Pat. No. 4,096,736. H. Yonak suggests a photo-acoustic leak detection and localization system and method based on photo-acoustic sound emission initiated by a carbon dioxide ($CO_2$) laser in U.S. Pat. No. 6,227,036. A microphone array technique is suggested by Greene in U.S. Pat. No. 5,533,383 for detecting acoustic leaks.

Those methods developed for defect diagnostics and quality control generate an invalid result if the ambient noise $p_n(t)$ becomes dominant in the measured signal $p(t,r_i)$. In the Japanese patent application JP 61191868, N. Tomoyasu suggested the use of a second microphone which measures the sound pressure $p(t,r_n)$ of the ambient noise source. If this sound pressure $p(t,r_n)$ exceeds a predefined level, the signal $p(t,r_i)$ measured at the device under test is not reliable and may be corrupted by noise. In "Loudspeaker Testing at the Production Line, Proceedings of the 120$^{th}$ Convention of the Audio Eng. Soc.", Paris (France) September 2006, Klippel et al. suggested that a corrupted measurement should be repeated until the ambient noise $p(t,r_n)$ is below the allowed limit. This technique increases the measurement time significantly, and a valid measurement cannot be assured within a given production cycle time. The technique also requires that the ambient noise source $r_n$ be far away from the device under test, and the second noise microphone should be placed closer to the ambient noise source than the measurement microphone. However, in many practical applications the position $r_n$, of the ambient noise source is not known or the ambient noise source is moving.

All of the known techniques fail in the detection and separation of a defect when the ambient noise $p_n(t)$ is smaller than the linear measured signals $p_{lin}(t,r_i)$ but larger than the regular, stochastic or deterministic distortion component $p_{reg}(t,r_i)$, $p_{stoch}$ $(t\ r_i)$ and $p_{rb}(t,r_i)$, respectively.

OBJECTS OF THE INVENTION

Thus, there is a need for a diagnostic system which detects defects of devices under test, identifies their physical causes and localizes the positions of the defects. This measurement should be performed with high accuracy within a short time while the device under test is operated in a normal (production) environment and ambient noise emitted by unknown sources may affect the measured signal $p(t,r_i)$. A further object is to use a minimum of hardware elements to keep the cost of the system low.

SUMMARY OF THE INVENTION

According to the present invention, the present diagnostic system monitors signals $p(t,r_i)$ at multiple measurement points $r_i$ (with $1 \leqq i \leqq I$) which are affected by defect sources $q(t, r_{d,j})$ (with $1 \leqq j \leqq J$) of the device under test at position $r_{d,j}$ and by ambient noise sources $q(t, r_{n,k})$ at position $r_{n,k}$ (with $1 \leqq k \leqq K$). In contrast to prior art, a source analyzer separates the signals emitted by the defect sources $q(t, r_{d,j})$ and noise sources $q(t, r_{n,k})$ by combining spatial analysis and signal analysis to exploit information about the location of the sources and properties of stochastic and deterministic distortion components emitted by the sources. The linear part $p_{lin}$ $(t,r_i)$, which is coherent with the stimulus u(t) may be suppressed by filtering because this part contains no significant clues about some defects of the device under test. The spatial analysis performed by the source analyzer includes the identification of the number of sources, the classification into defect and noise sources and localization of the sources. The source analyzer generates defect vectors $D((t,r_{d,j})$ and noise vector $N(t,r_{n,k})$ which comprise deterministic components $p_{det}(t,r_{d,j})$ and $p_{det}(t,r_{n,k})$, stochastic components $p_{stoch}(t,r_{d,j})$ and $p_{stoch}(t, r_{n,k})$ and information about the position of each identified source $\tau_{d,j}$ and $\tau_{n,k}$ corresponding with the separated defect and noise sources, respectively. The signal analysis applied to the separated source signals increases the sensitivity of the diagnostic system to defects of a device under test which have less energy and similar spectral properties as ambient noise. The separation of the deterministic components $p_{det}(t,r_{d,j})$ and stochastic signal components $p_{stoch}(t,r_{d,j})$ allows the system to perform an averaging of properties of incoherent signals. Thus, a novel demodulation technique provides the envelope of modulated stochastic signals as generated by air leaks, and the direction of the source. The signal-to-noise ratio can be improved by increasing the measurement time and averaging the envelope signal over an increased number of periods. Using a periodic stimulus with a time varying period length $T(t) \neq T_0$, such as a sinusoidal sweep, the deterministic components are determined by transforming the measured signal to a constant period length $T_0$ and averaging the transformed signals in the phase space.

The orthogonal features in the defect vector $D((t,r_{d,j})$ and noise vector $N(t,r_{n,k})$ are transferred to a defect classificator which determines the quality of the device under test and identifies the physical causes of the defects. The system stays operative if the positions of the sensors, defect and noise sources change. Contrary to known beam steering techniques, the system requires a low number of sensors and can remain operative with only two sensors. The angle of the incident wave can be detected with sufficient accuracy because the deterministic and stochastic signal components emitted by the defects comprise many spectral components which cover a wide frequency band and which are incoherent with the stimulus. However, an array comprising only two sensors has a low directivity characteristic and cannot separate the defect and noise sources completely, and the measured defect vector $D((t,r_{d,j})$ may be corrupted by the noise source. In this case, the classificator detects invalid parts of the defect vector $D((t,r_{d,j})$ automatically by comparing stochastic and deterministic components of the defect vector $D((t,r_{d,j})$ and of the noise vector $N(t,r_{n,k})$ with each other and/or with predefined thresholds. According to the invention, the valid parts of the defect vector $D((t,r_{d,j})$ are stored in an accumulator and are merged with valid parts from repeated measurements using the same stimulus, eventually giving a complete valid data set. Since most of the ambient noise is a random signal, the accumulation of valid data gives full noise immunity while keeping the measurement time much shorter than traditional techniques using extensive averaging. The diagnostic system transforms the analyzed data in the defect vector $D((t,r_{d,j})$ into a lower frequency range where the symptoms of the defects can be analyzed more easily by a human ear. This auralization technique improves subjective assessment of the defect by a human expert and gives clues for finding the physical cause of the defect. The results of the subjective classification may be provided together with the objective data in the defect vector $D((t,r_{d,j})$ to an expert system which creates a knowledge base for the automatic classification of the defects.

These and other features, aspects and advantages of the present invention will become better understood with reference to the following drawings, description and claims.

DETAILED DESCRIPTION OF THE INVENTION

Figure 1:
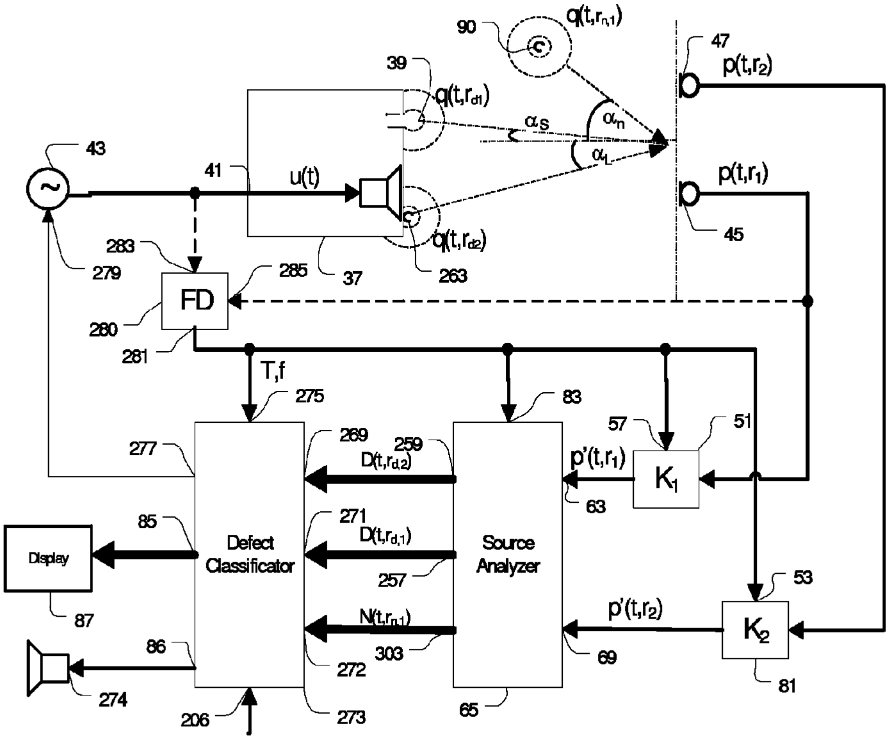
FIG. 1 is a general block diagram showing an arrangement for diagnosing the operating state of a device under test in accordance with the present invention.

FIG. 1 is a general block diagram showing an arrangement for diagnosing the operating state of a device under test system 37 in accordance with the invention, coping with an ambient noise source 90 emitting a noise signal $q(t, r_{n,k})$ with k=1, which is superimposed with defect signal $q(t,r_{d,j})$ with j=1.2 emitted by defects 39, 263 on the device under test. The device under test 37, which is, for example, a loudspeaker, has an input 41 which is provided with a stimulus u(t) generated by a generator 43. At least two sensors 45, 47 located at arbitrary positions $r_1$, $r_2$ generate output signals $p(t, r_i)$ with i=1.2. Each signal $p(t, r_i)$ is supplied via a controllable high-pass 51, 81 as a filtered signal $p'(t, r_i)$ to inputs 63, 69 of a source analyzer 65. The source analyzer 65 generates at least one defect vector $D(t,r_{d,j})$ at outputs 259, 257 which corresponds with the defects 39 and 263, and a noise vector $N(t, r_{n,k})$ with k>1 at an output 303 which corresponds with the detected noise source 90. All vector outputs 259, 257, 303 of the source analyzer 65 are connected to vector inputs 269, 271, 272 of a classificator 273 which provides information on the location of the source, and relevant features of the deterministic component $p_{det}(t)$ and statistic component $p_{stoch}(t)$ which are relevant for diagnostics. The classificator 273 assesses the quality of the system, identifies the cause and location of the defect and gives those results via an output 85 to a display 87. Auralization signals derived from the defect vectors are provided via an output 86 to a loudspeaker 274 to support a subjective evaluation of the defects by a human ear. A frequency detector 280 either receives the stimulus u(t) from generator 43 via an input 283, or a measured signal $p(t, r_i)$ from sensor 45 via input 285, and detects the instantaneous period length T(t) and frequency f(t) of the excitation signal and supplies this information via an output 281 to the control inputs 275, 83, 57 and 53 of the defect classificator 273, source analyzer 65 and high-passes 51, 81, respectively.

Figure 2:
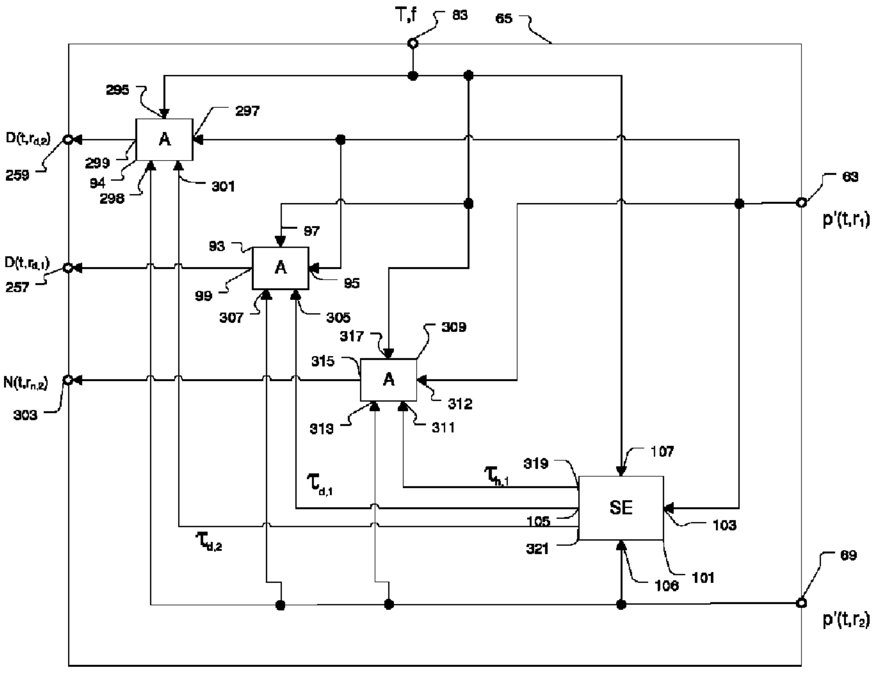
FIG. 2 shows an embodiment of a source analyzer using two sensors as might be used with a diagnostic system in accordance with the present invention.

FIG. 2 is a block diagram showing an embodiment of the source analyzer 65 comprising a source estimator 101, at least one defect analyzer 93, 94 and at least one noise analyzer 309. The source estimator 101 has two inputs 103 and 106 receiving the filtered signals $p'(t,r_i)$ with i>1 from inputs 63, 69, has at least one defect location output 105, 321 and at least one noise location output 319 providing information describing the distance between the positions $r_{d,j}$, $r_{n,k}$ of sources 39, 263, 90 and measurement positions $r_i$ of the sensors 45, 47. This information is, for example, given by the transfer function:

$$H_{d,j}(f) = \frac{|r_{d,j} - r_2|\exp(jk|r_{d,j} - r_1|)}{|r_{d,j} - r_1|\exp(jk|r_{d,j} - r_2|)}, \quad (2)$$

assuming free field propagation between the sources and the sensors. In practice, it is completely sufficient to identify the difference in the time delay as follows:

$$\tau_{d,j} = \frac{|r_{d,j} - r_1| - |r_{d,j} - r_2|}{c_0}, \quad (3)$$

or the attenuation ratio:

$$D_{d,j} = \frac{|r_{d,j} - r_1|}{|r_{d,j} - r_2|}, \quad (4)$$

using wavenumber k and the speed of sound $c_0$.

The location outputs 321, 105, 319 are connected with the location inputs 301, 305, 311 of the corresponding defect analyzer 94, 93 and noise analyzer 309. Each of the analyzers 94, 93 and 309 has got an output 299, 99, 315 providing vectors $D(t,r_{d,j})$, $N(t,r_n)$ at the outputs 259, 257, 303 of the source analyzer 65.

Figure 3:
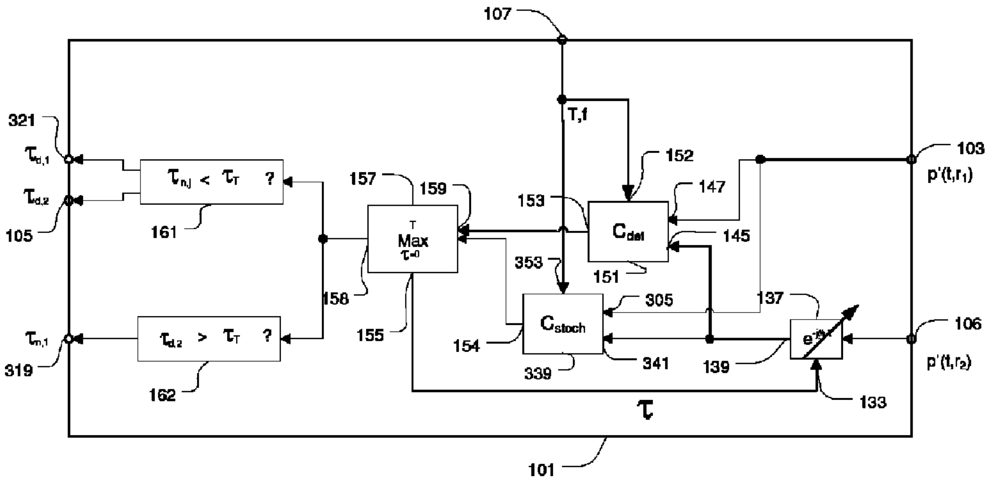
FIG. 3 shows an embodiment of a source estimator as might be used with a diagnostic system in accordance with the present invention.

FIG. 3 shows an embodiment of the source estimator 101. The signal $p'(t,r_1)$ at the first input 103 is supplied to an input 305 of a stochastic correlator 339 and to an input 147 of a deterministic correlator 151. The signal $p'(t,r_2)$ at the second input 106 is supplied via a controllable filter 137 to inputs 341 and 145 of correlators 339 and 151, respectively. The outputs 153, 154 of the correlators are supplied to the input 159 of a maximum detector 157, which generates a variable control parameter (e.g. time delay $\tau$) at a control output 155 supplied to the control input 133 of controllable filter 137. The maximum detector 157 detects the values of the control parameter (e.g., time delay estimates $\tau_j$) where the signals at outputs 153, 154 have global or local maxima. The output of the maximum detector 157 is supplied to two comparators 161 and 162 which compare the identified parameter $\tau_j$ with a predefined limit $\tau_T$ to classify them as local information $\tau_{d,j}$ and $\tau_{d,k}$ of defect and noise sources, respectively. The source identification, for example, exploits the relationship between the angle:

$$\alpha_{d,j} = \arccos\left(\frac{c_0 \tau_{d,j}}{|r_2 - r_1|}\right) \quad (5)$$

of the incident wave emitted by the source at position $r_{d,j}$ and time delay $\tau_{d,j}$ and the distance between the two sensors.

Figure 4:
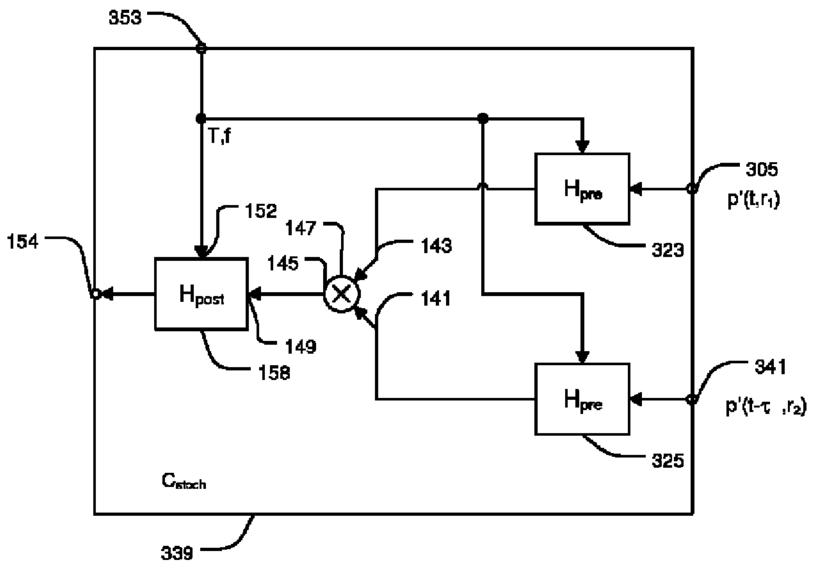
FIG. 4 shows an embodiment of a cross-correlator as might be used with a diagnostic system in accordance with the present invention.

FIG. 4 shows an embodiment of the stochastic correlator 339. The input signals $p'(t,r_1)$ and $p'(t-\tau, r_1)$ at inputs 305 and 341 are transformed by pre-filters 323 and 325 into stochastic components $p'_{stoch}(t,r_1)$ and $p'_{stoch}(t-\tau, r_1)$ supplied to the inputs 143 and 141 of a multiplier 147. For a steady-state excitation signal with the period length T the filters 323 and 325 with the transfer function:

$$H_{stoch}(j\omega) = \prod_{k=1}^{K} (1 - \delta(2\pi k / T - \omega)) \quad (6)$$

attenuate all components which are multiples of the fundamental frequency $f_0=1/T$.

The output 145 of the multiplier 147, filtered by the post-filter 158 with the transfer function:

$$H_{det}(j\omega) = \prod_{k=L}^{K} \delta(2\pi k / T - \omega), \quad (7)$$

provides a demodulated squared envelope:

$$e(t)^2 = F^{-1}\{H_{det}(j\omega)\} * (p'_{stoch}(r_i,t) p'_{stoch}(r_j,t+\tau)) \quad (8)$$

of the modulated noise signal to the output 154 of the correlator 339.

The block diagram in FIG. 4 also describes the general structure of the deterministic correlator 151. Contrary to the stochastic correlator, the pre-filters 323 and 325 enhance the deterministic components by having a transfer function $H_{det}(j\omega)$ according to Eq. (7), and the post-filter 158 selects the dc-component only.

Figure 5:
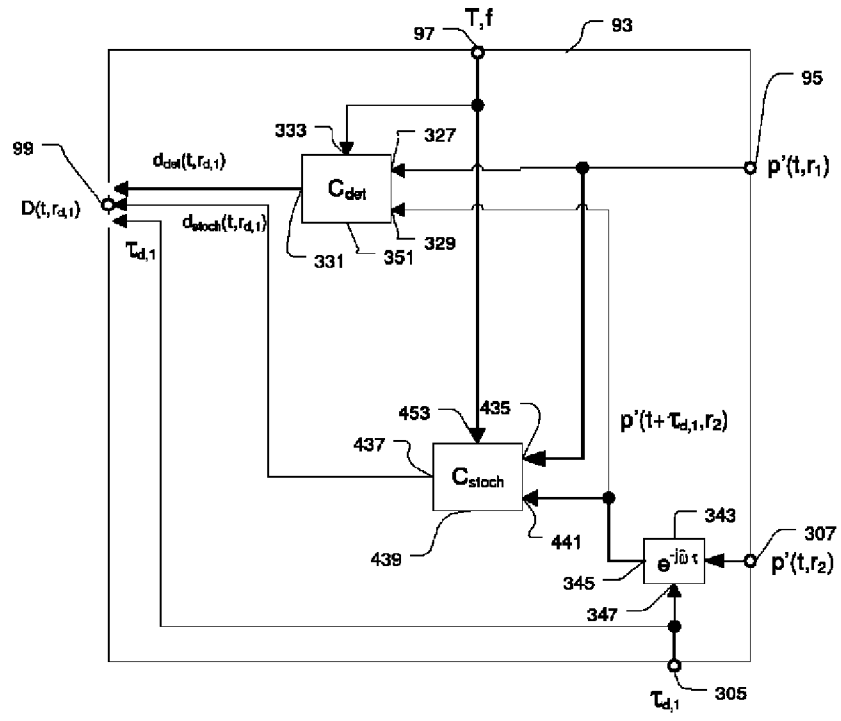
FIG. 5 shows an embodiment of a defect analyzer as might be used with a diagnostic system in accordance with the present invention.

FIG. 5 shows an embodiment of defect analyzer 93, but the general structure of this block diagram is also valid for the other analyzers 94, 309. The signal $p'(t,r_1)$ at input 95 is supplied to the input 327 of a deterministic signal processor 351 and the input 435 of a stochastic signal processor 439. The signal $p'(t,r_2)$ at input 307 is connected via a correction filter 343 to the other inputs 329 and 441 of processors 351 and 439, respectively. The correction filter 343 can be realized as a delay unit receiving a control signal $\tau_{d,1}$ via a control input 347 which generates a time delayed signal $p'(t+\tau_{d,1}, r_2)$. The stochastic signal processor 439 can be realized by using the same embodiment as was used for the cross-correlator 339 shown in FIG. 4. The envelope signal $e(t)^2$ generated at output 437 is an important feature for the detection of modulated noise as generated by air leaks. The envelope signal $e(t)^2$ comprises the fundamental frequency $f_o=1/T$ supplied to the device under test via the stimulus u(t), as well as harmonics of $f_0$. The signal-to-noise ratio of the detected envelope signal $e(t)^2$ can be increased by extending the measurement time. The outputs 437, 331 of the stochastic and deterministic signal processors 439 and 351, respectively, and the time delay control signal $\tau_{d,1}$ are summarized to the defect vector $D(t,r_{d,1})$ at output 99. The processors 439 and 351 have a control input 453 and 333, respectively, which receive the instantaneous frequency f(t) or period length T via an input 97, which is received from frequency detector 280 via input 83 of source analyzer 65.

Figure 6:
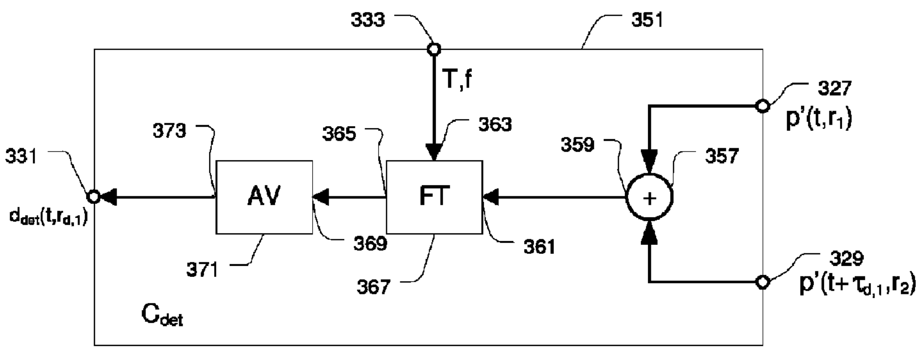
FIG. 6 shows an embodiment of a deterministic signal processor as might be used with a diagnostic system in accordance with the present invention.

FIG. 6 shows an embodiment of the deterministic signal processor 351. The signals at the inputs 327 and 329 are supplied to an adder 357, and the summed signal $p_{sum}(t)$ at output 359 is averaged in the phase space according to the invention, to generate the deterministic component:

$$p_{det}(t, r_{d,1}) = \frac{1}{K} \sum_{k=1}^{K} p_{sum}(t + t_k + t'_k) \quad (9)$$

$$t_k = \begin{cases} 0, & k = 0 \\ t_{k-1} + T(t + t_{k-1}), & k > 1 \end{cases}$$

$$t'_k = \frac{\angle H_{lin}(j2\pi / T(t_k)) \cdot T(t_k)}{2\pi}.$$

The averaging in the phase space requires a frequency converter 367 having an input 361 connected to adder output 359; and the frequency converter transforms the summed signal $p_{sum}(t)$ having a time varying period length T(t) to a signal $p'_{sum}(t)$ at output 365 having a constant frequency period length $T_0$. The frequency converter may also consider an additional phase shift $\angle H_{lin}(j\omega)$ generated by the linear transfer response between the stimulus u(t) at generator 43 and the defect source 263. A conventional averager 371 having an input 369 connected with frequency converter output 365 generates the deterministic component at an output 373, which is provided at processor output 331.

Figure 7:
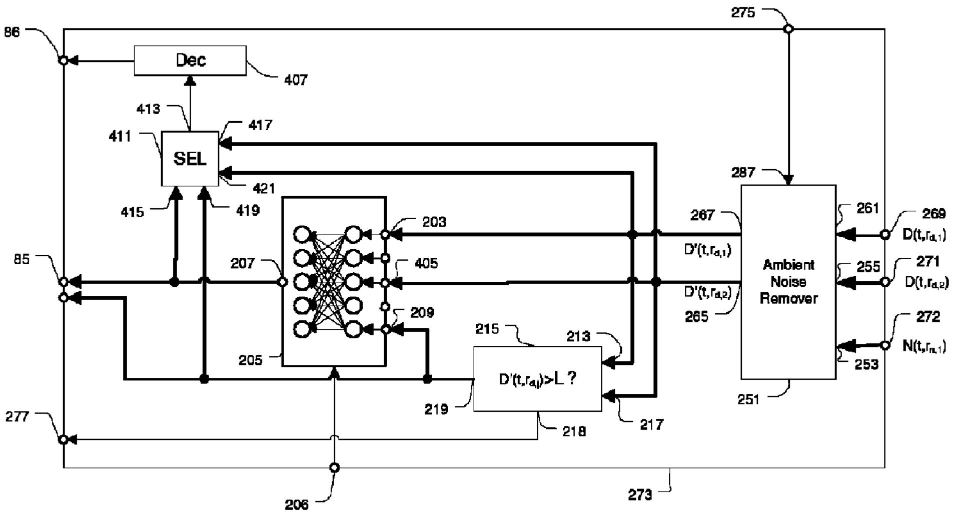
FIG. 7 shows an embodiment of a classificator as might be used with a diagnostic system in accordance with the present invention.

FIG. 7 shows an embodiment of defect classificator 273. The defect vectors $D(t, r_{d,j})$ and noise vectors $N(t,r_{n,k})$ received at inputs 269, 271, 272 are supplied to the inputs 261, 255, 253 of an ambient noise remover 251 generating valid defect vectors $D'(t, r_{d,j})$ at outputs 267, 265 which are not corrupted by the ambient noise source 90. Those outputs are connected to the inputs 213 and 217 of a comparator 215 which compares the properties of the deterministic and stochastic signal components with predefined thresholds and generates a quality assessment (grading or a pass/fail decision) for device under test 37, which is supplied to the classificator output 85. The classificator contains also a defect identifier 205, realized with fuzzy logic and having multiple inputs 203, 405, 209 connected with outputs 267, 265 and 219. The defect identifier 205 receives information about the physical cause of the defect via an input 206, and generates an internal knowledge base which is used for the automatic classification. The results of the classification, provided at an output 207, are also supplied to output 85. The valid defect vectors $D'(t, r_{d,j})$ are also supplied to the inputs 417, 421 of a selector 411 which selects the deterministic component $d_{det}(t,r_{d,j})$ or stochastic component $d_{stoch}(t,r_{d,j})$ of the dominant defect at position $r_{d,j}$ by exploiting the data received from fuzzy logic output 207 and comparator output 219 provided via inputs 415 and 419, respectively. The selected signal at output 413 is transformed via a frequency converter 407 and provided at output 86 connected to a loudspeaker. The frequency converter 407 transforms the high frequency content to a lower frequency band where the spectral and temporal properties of the defects can be analyzed more easily by a human ear.

Figure 8:
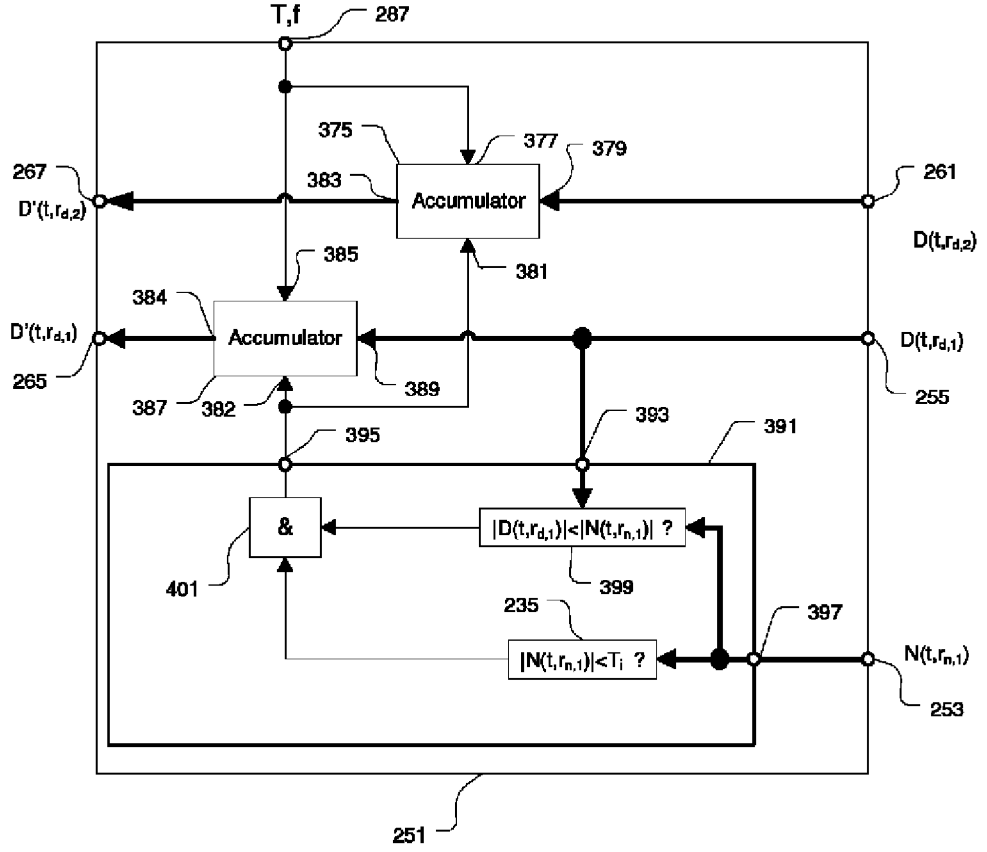
FIG. 8 shows an embodiment of a noise remover as might be used with a diagnostic system in accordance with the present invention.

FIG. 8 shows an embodiment of the ambient noise remover 251. The noise vector $N(t,r_{n,k})$ is received at input 253 and is supplied to the input 397 of a noise detector 391. A comparator 235 compares the elements of the noise vector $N(t,r_{n,k})$ with a predefined threshold $T_i$, such that the comparator's output indicates a possible noise corruption. The noise detector 391 also contains a second comparator 399 which compares the defect vector $D(t,r_{d,j})$ received via an input 393 with the noise vector $N(t,r_{n,k})$. The output of comparator 399, which indicates that the defect vector exceeds the noise vector, is combined with output of the comparator 235 in 401 and supplied via output 395 to the control inputs 381, 382 of accumulators 375 and 387, respectively. Each accumulator 387, 375 has an input 389, 379 receiving the defect vector $D(t,r_{d,j})$ from inputs 261 and 255, respectively. The accumulators 387, 375 only store the valid parts of the defect vectors $D(t,r_{d,j})$ by using the control signals at inputs 381, 382, and provide a valid defect vector $D'(t,r_{d,j})$ a to outputs 265, 267 if the data are complete.

Figure 9:
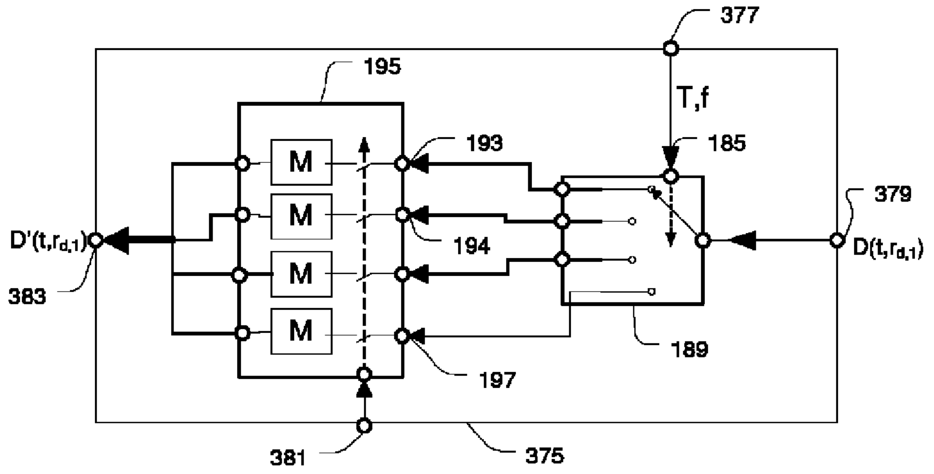
FIG. 9 shows an embodiment of an accumulator as might be used with a diagnostic system in accordance with the present invention.

FIG. 9 shows an embodiment of accumulator 375. The defect vector $D(t, r_{d,j})$ at input 379 is distributed via switch 189 to the inputs 193, 194 and 197 of a memory 195 according to the instantaneous frequency f received from the frequency detector 280 via an input 377, input 287 of ambient noise remover 251, and input 275 of defect classificator 273. The memory stores the input data if the control signal at a control input 381 indicates valid data which are not corrupted by ambient noise. If all elements of the memory 195 contain data, the valid defect vector $D'(t, r_{d,j})$ is supplied to an output 383.

I claim:

1. An arrangement for diagnosing the operating state of a device under test in the presence of ambient noise source and detecting, localizing and classifying defects of said device, characterized in that said arrangement comprises:

an excitation means which provides a stimulus u(t) for exciting the device under test, at least two sensors measuring signals $p(t,r_i)$ at arbitrary positions $r_i$ with $1 \leqq i \leqq I$, and providing said measured signals to respective sensor outputs, at least two filters, each having an input which receives a respective one of said measured signals $p(t,r_i)$ from said sensors, and an output which provides a filtered signal $p'(t, r_i)$ which is incoherent with the stimulus u(t), a source analyzer having at least two inputs, each of which receives a respective one of the filtered signals $p'(t,r_i)$ from said filter outputs, and having at least one analyzer defect output providing a defect vector $D(t,r_{d,j})$ which contains analyzed properties of the signal $q(t,r_{d,j})$ emitted by a defect source at position $r_{d,j}$ with $1 \leqq j \leqq J$ of said device under test while suppressing the signals $q(t,r_{n,k})$ emitted by an ambient noise source at a different location $r_{n,k} \neq r_{d,j}$, and a classificator having at least one vector input connected to receive said analyzer defect output and having a classificator output which indicates the quality status of the device under test, wherein said defect vector $D(t,r_{d,j})$ comprises a deterministic component $d_{det}(t,r_{d,j})$, a stochastic component $d_{stoch}(t,r_{d,j})$, and information about the location $r_{d,j}$, and wherein said source analyzer has at least one analyzer noise output providing a noise vector $N(t,r_{n,k})$ which contains analyzed properties of the signals $q(t,r_{n,k})$ emitted by said ambient noise source at position $r_{n,k}$ with $1 \leqq k \leqq K$ while suppressing the signals $q(t,r_{d,j})$ emitted by any defect source, said classificator including an ambient noise remover having at least one device input connected with said device vector input and at least one noise input connected with said at least one noise source output, and having at least one output providing a valid defect vector $D'(t,r_{d,j})$ with $1 \leqq j \leqq J$ containing valid properties of the signal $q(t,r_{d,j})$ emitted by said defect signal source on the device under test which is not corrupted by said ambient noise source.

2. An arrangement according to claim 1, characterized in that said source analyzer comprises:

a source estimator having at least two inputs connected with said analyzer inputs and having at least one defect location output providing a time delay estimate $\tau_{d,j}$ or a transfer function $H_{d,j}(f)$ which corresponds with the difference in the distance between the defect source and said at least two sensors, and having at least one noise location output providing an estimated time delay $\tau_{n,k}$ or an estimated transfer function $H_{n,k}(f)$ which corresponds with the distance between the ambient noise source and said sensors, at least one defect analyzer, each having inputs connected with said source analyzer inputs and having a control input connected with said defect location output and having an output generating said defect vector $D(t,r_{n,j})$ connected with said analyzer defect output, and at least one noise analyzer, each having inputs connected with the source analyzer inputs and having a control input connected with said noise location output and having an analysis output generating a vector $N(t,r_{n,k})$ connected with said analyzer noise output.

3. An arrangement according to claim 2, characterized in that said source estimator comprises:

a varying time delay unit having an input connected with one of said source estimator inputs and a control input, a cross-correlator having a first input connected with the other of said source estimator inputs, a second input connected with the output of said varying time delay unit and having an output generating a cross-correlation function versus delay time $\tau$, a maximum detector having an input receiving said cross-correlation function and having an output generating a vector containing time delay values $\tau_j$ with j=1, . . . M where the cross-correlation function has maxima, a first comparator having an input receiving the time delay values $\tau_j$ and having an output generating a time delay value $\tau_{d,j}$ supplied to said at least one noise defect location output, a second comparator having an input receiving the time delay values $\tau_j$ and having an output generating a time delay value $\tau_{n,k}$ supplied to said at least one noise location output.

4. An arrangement according to claim 3, characterized in that said cross-correlator comprises:

two pre-filters, each having an input connected with one of the cross-correlator inputs and each having an output generating a signal where the deterministic signal components are suppressed, a multiplier having two inputs, each connected with the output of one of said prefilters and having an output which generates a demodulated output signal, and a post filter having an input connected to said multiplier output and having an output connected to said cross-correlator output where the envelope is generated.

5. An arrangement according to claim 2, characterized in that said defect analyzer and said noise analyzer comprise:

a correction filter having an input connected to one of said defect analyzer inputs and having a control input which receives the control data connected with said defect analyzer control input and having an output, at least one stochastic signal processor having a first input connected to the other of said defect analyzer inputs and having a second input connected to said output of said correction filter and having an output providing a stochastic feature $d_{stoch}(t,r_{d,j})$ to said defect analyzer output, at least one deterministic signal processor having a first input connected to the other of said defect analyzer inputs and having a second input connected to said output of said correction filter and having an output providing a deterministic feature $d_{det}(t,r_{d,j})$ to said defect analyzer output.

6. An arrangement according to claim 5, characterized in that said deterministic signal processor comprises:

an adder having two inputs, each connected to a respective one of said deterministic signal processor inputs and generating the total signal at an output, a frequency converter having an input connected to said adder output, a control input connected with an output of a frequency detector and receiving the instantaneous fundamental frequency f(t) of the stimulus u(t), and having an output providing an output signal having a constant fundamental frequency $f_0$, and a periodic averager having an input connected to said frequency converter output and having an output connected with said deterministic signal processor output and providing the sum of adjacent sections of constant length $T_0=1/f_0$ of the input signal received at said periodic averager input.

7. An arrangement according to claim 1, characterized in that said ambient noise remover comprises:

a noise detector having at least one input connected to said classificator noise input, and having a noise detector output which indicates uncorrupted data in the defect vector $D(t,r_{d,j})$ with $1\leqq j\leqq J$, at least one accumulator, each having an input connected with an ambient noise remover input and having a control input which is connected with the noise detector output, each accumulator comprising a memory where the instantaneous defect vector $D(t,r_{d,j})$ with $1<j\leqq J$ is stored if the signal at the control input indicates valid data, each accumulator having an output which is provided with said valid defect vector $D'(t,r_{d,j})$ with $1\leqq j\leqq J$ if the accumulation of the valid data in the memory is completed.

8. An arrangement according to claim 1, characterized in that said classificator comprises:

a control output connected to a control input of said excitation means to repeat the measurement if said valid defect vector $D'(t,r_{d,j})$ at the output of the ambient noise remover is not generated, and a comparator having at least one input receiving at least one valid defect vector $D'(t,r_{d,j})$ from said output of the ambient noise remover, the comparator having an output connected with the classificator output and generating a Pass/Fail verdict for the device under test considering all defect sources, and a defect identifier having at least one input receiving at least one valid defect vector $D'(t,r_{d,j})$ from said output of the ambient noise remover, and having an output connected with the classificator output and providing information on the location of the defect sources and assigning the defects to a predefined class.

9. An arrangement for diagnosing the operating state of a device under test in the presence of ambient noise source and detecting, localizing and classifying defects of said device, characterized in that said arrangement comprises:

an excitation means which provides a stimulus u(t) for exciting the device under test, at least two sensors measuring signals $p(t,r_i)$ at arbitrary positions $r_i$ with $1\leqq i\leqq I$, and providing said measured signals to respective sensor outputs, at least two filters, each having an input which receives a respective one of said measured signals $p(t, r_i)$ from said sensors, and an output which provides a filtered signal $p'(t, r_i)$ which is incoherent with the stimulus u(t), a source analyzer having at least two inputs, each of which receives a respective one of the filtered signals $p'(t, r_i)$ from said filter outputs, and having at least one analyzer defect output providing a defect vector $D(t,r_{d,j})$ which contains analyzed properties of the signal $q(t,r_{d,j})$ emitted by a defect source at position $r_{d,j}$ with $1\leqq j\leqq J$ of said device under test while suppressing the signals $q(t,r_{n,k})$ emitted by an ambient noise source at a different location $r_{n,k}\neq r_{d,j}$, and a classificator including an ambient noise remover having at least one vector input connected to receive said analyzer defect output and having a classificator output which indicates the quality status of the device under test, characterized in that said classificator comprises:

a comparator having at least one input receiving a signal from said at least one device vector input, the comparator having an output connected with the classificator output and generating a Pass/Fail verdict for the device under test considering all defect sources, having an control output connected via an output of the classificator to a control input of said excitation means to stop the measurement if the measured data are complete and valid, a defect identifier having at least one input receiving a signal from said at least one device vector input, and having an output connected with the classificator output and providing information on the location of the defect sources and assigning the defects to a predefined class, a selector having at least one input receiving at least one valid defect vector $D'(t,r_{d,j})$ from said output of the ambient noise remover, having control inputs connected with the output of said comparator, and having an output providing a distortion signal generated by a defect source, and a frequency converter having an input connected to output of the selector and having an output generating an output signal transformed to a lower frequency which is supplied via an output of the classificator for human inspection using a sound reproduction system.

10. A method for diagnosing the operating state of a device under test in the presence of ambient noise and detecting, localizing and classifying defects of said device, comprising:

exciting the device under test with a stimulus u(t) with an excitation means, acquiring at least two signals $p(t, r_i)$ at arbitrary locations $r_i$ with $1 \leqq i \leqq I$, identifying local information on the position of the defects, performing a combined spatial and signal analysis of the signals $p(t, r_i)$, generating at least one defect vector $D(t,r_{d,j})$ describing the properties of a signal $q(t,r_{d,j})$ emitted by a defect source of the device under test at position $r_{d,j}$ with $1 \leqq j \leqq J$ while suppressing the signals $q(t,r_{n,k})$ emitted by an ambient noise source at a different location $r_{n,k} \neq r_{d,j}$, assessing the elements of the defect vector $D(t,r_{d,j})$ to diagnose the operating state of the device under test, and generating at least one noise vector $N(t,r_{n,k})$ describing the properties of a signal $q(t,r_{n,k})$ emitted by an ambient noise source at position $r_{n,k}$ with $1 \leqq k \leqq K$ while suppressing the signal components $q(t,r_{d,j})$ emitted by any defect source, and identifying the invalid parts of the defect vector $D(t,r_{d,j})$ which are corrupted by the ambient noise source by checking the values in said noise vector $N(t,r_{n,k})$.

11. The method of claim 10, further comprising:

removing the invalid parts of defect vector $D(t,r_{d,j})$ which are corrupted by said ambient noise source, storing the valid parts of defect vector $D(t,r_{d,j})$ in a memory, repeating a corrupted measurement by applying the same stimulus u(t) to the device under test, accumulating the valid parts of defect vector $D(t,r_{d,j})$ found in corrupted measurements in a valid defect vector $D'(t, r_{d,j})$ with $1 \leqq j \leqq J$, and stopping the measurement if the defect vector $D'(t,r_{d,j})$ is complete.

12. The method of claim 10, further comprising:

estimating a time delay $\tau_{d,j}$ or a transfer function $H_{d,j}(f)$ which corresponds with the difference in the distance between a first defect source and at least two sensors which measure signals $p(t,r_i)$ at arbitrary positions $r_i$ with $1 \leqq i \leqq I$, estimating a time delay $\tau_{n,k}$ or a transfer function $H_{n,k}(f)$ which corresponds with the difference in the distance between an ambient noise source and said sensors, filtering said measured signals $p(t, r_i)$ from said sensors to provide a filtered signal $p'(t, r_i)$ which is incoherent with the stimulus u(t), analyzing the deterministic and/or stochastic properties of the filtered signals $p'(t, r_i)$ by compensating said time delay $\tau_{d,j}$ or transfer function $H_{d,j}(f)$ in order to suppress the influence of said ambient noise source and a second defect source in the generated defect vector $D(t,r_{d,j})$, and analyzing the deterministic and/or stochastic properties of the filtered signals $p'(t, r_i)$ by compensating said time delay $\tau_{n,j}$ or transfer function $H_{n,k}(f)$ in order to suppress the influence of said first and second defect sources in the generated noise vector $N(t,r_{n,l})$.

13. The method of claim 12, further comprising:

applying a time delay $\tau_{d,2}$ or a transfer function $H_{d,2}(f)$ to the input signal $p'(t,r_2)$ in order to generate an output signal given by: $p'(t-\tau_{d,2}, r_2)$, filtering the input signal $p'(t,r_1)$ in order to suppress deterministic signal components and to generate a stochastic signal $p'_{stoch}(t,r_1)$, filtering the delayed signal $p'(t-\tau_{d,2}, r_2)$ in order to suppress deterministic signal components and to generate a stochastic signal $p'_{stoch}(t-\tau_{d,2},r_2)$, multiplying the signal $p'_{stoch}(t-\tau_{d,2},r_2)$ with $p'_{stoch}(t,r_1)$ to demodulate the stochastic components, and filtering the demodulated signal to extract a deterministic envelope signal.

14. The method of claim 12, further comprising:

applying a time delay $\tau_{d,2}$ to the input signal $p'(t,r_2)$ in order to generate an output signal given by: $p'(t-\tau_{d,2}, r_2)$, adding the signal $p'(t,r_1)$ and the time delayed signal $p'(t-\tau_{d,2}, r_2)$ to generate a total signal, receiving the instantaneous frequency f(t) of the fundamental component in stimulus signal u(t), shifting the frequency of all spectral components in the total signal in order to realize a constant fundamental frequency $f_0$ in the output signal, cutting the output signal into adjacent segments of constant length corresponding with the period $T_0=1/f_0$ of the fundamental component, and averaging the segments in order to generate a deterministic signal.

* * * * *